United States Patent [19]

Muehlbauer et al.

[11] Patent Number: 5,492,960

[45] Date of Patent: Feb. 20, 1996

[54] METHOD OF MAKING POLYMERIC PARTICLES

[75] Inventors: John L. Muehlbauer; Dennis E. Smith; Thomas H. Whitesides, all of Rochester, N.Y.

[73] Assignee: Eastman Kodak Company, Rochester, N.Y.

[21] Appl. No.: 330,653

[22] Filed: Oct. 28, 1994

[51] Int. Cl.$^6$ .................... C08J 3/02; C08K 3/20; C08L 31/00; C08F 2/16
[52] U.S. Cl. .................. 524/457; 524/459; 524/475; 524/800; 524/848; 526/89; 526/207
[58] Field of Search .................. 524/457, 475, 524/800, 848, 459; 526/89, 207

[56] References Cited

U.S. PATENT DOCUMENTS

| | | | |
|---|---|---|---|
| 3,324,097 | 6/1967 | Pears et al. | 260/92.8 |
| 3,357,158 | 12/1967 | Hollis | 55/67 |
| 3,549,562 | 12/1970 | Mindick et al. | 260/2.1 |
| 4,052,343 | 10/1977 | Cunningham | 260/2.1 |
| 4,256,840 | 3/1981 | Meitzner et al. | 521/33 |
| 4,336,173 | 6/1982 | Ugelstad | 523/205 |
| 4,382,124 | 5/1983 | Meitzner et al. | 521/38 |
| 4,677,003 | 6/1987 | Redlich et al. | 264/4.7 |

FOREIGN PATENT DOCUMENTS

| | | | |
|---|---|---|---|
| 0575143 | 12/1993 | European Pat. Off. | |
| 37-7631 | 9/1962 | Japan | 526/207 |

OTHER PUBLICATIONS

J. A. Alduncin, J. Forcada, & J. M. Asua, *Macromolecules*, 1994, 27, pp. 2256–2261.

M. J. Unuze & J. M. Asua, *J. Appl. Polym. Sci.*, 49 (1993) pp. 81–90.

J. Delgado, M. S. El–Aaser, C. A. Silebi, & J. W. Vanderhoff, *J. Polym. Sci.: Part A: Polym. Chem.*, 27 (1989) pp. 193–202.

S. R. Rodriguez, J. M. Asua, M. S. El–Aaser, & C. A. Silebi, *J. Polym. Sci.: Part B: Polym. Phys.*, 29 (1991) pp. 483–500.

P. L. Tang, E. D. Sudol, C. A. Silebi, & M. S. El–Aasser, *J. Appl. Polym. Sci.*, 43 (1991) pp. 1059–1066.

K. Fontenot and F. J. Schork, *J. Appl. Polym. Sci.*, 49 (1993) pp. 633–655.

K. Fontenot & F. J. Schork, *Ind. Eng. Chem. Res.*, 32 (1993) pp. 373–385.

Ugelstad et al. *Adv. Colloid Interface Sci.*, 1980, 13, pp. 101–141.

J. Ugelstad, M. S. El–Aasser, J. W. Vanderhoff, *J. Polym. Sci., Polym. Lett. Ed.*, 11 (1973) pp. 503–513.

Danicher & Gramain, *React. Polym.*, 1993, 20, pp. 111–121.

*Primary Examiner*—Paul R. Michl
*Assistant Examiner*—Patrick Niland
*Attorney, Agent, or Firm*—Robert A. Gerlach

[57] ABSTRACT

A method of making polymeric particles of at least 1.0 micrometer which comprises forming at atmospheric conditions droplets of an ethylenically unsaturated monomer the monomer being liquid at standard conditions of 0° C. and one atmosphere pressure, together with from about 0.01 to about 5 percent by weight, based on the weight of the monomer, of a nonreactive compound in an aqueous medium, the nonreactive compound having a solubility in water less than that of the ethylenically unsaturated monomer, the aqueous medium containing a surfactant or organic hydrophilic colloid, the monomer droplets being formed by using only sufficient energy to achieve a size of 1.0 micrometer or larger, and polymerizing the ethylenically unsaturated monomer.

9 Claims, No Drawings 5,492,960

METHOD OF MAKING POLYMERIC PARTICLES

BACKGROUND OF THE INVENTION

1. Field of the Invention

This invention relates to a method of making uniformly-sized polymeric particles and, more particularly, to a method of making polymeric particles having a very low population of undersized particles.

2. Description of Related Art

Polymeric particles find application as photographic matte beads, electrophotographic toner particles, thermal print spacer beads, polymeric microvoiding agents, grinding media, spreading layers, particle size standards, filter challenge media, ion-exchange resin packing media, Merrifield synthesis supports and the like. Such particles can be made by a variety of in situ polymerization techniques such as suspension polymerization or limited coalescence polymerization as well as by crushing or grinding of solid polymer samples, spray drying, evaporation of solvent from a dispersion of a polymer solution, etc. In order to obtain a narrow particle size distribution of useful product, all of these techniques require extensive sorting and classification operations that are costly, time-consuming and cause substantial reductions in yield. Microsuspension polymerization is frequently used to provide easily processable polymeric products in high yield for the above applications. However, even with microsuspension polymerization, the particle size distribution of polymer particles is not ideal. In particular, it is commonly observed that not only is a substantial population of undersized particles formed, but also appreciable amounts of coagulum, resulting in a loss of yield of useful product. The presence of these materials introduces the necessity in addition for complex processing steps in manufacturing (e.g., filtration, sieving, cyclone separation, and the like). An object of this invention is to provide an improvement on the microsuspension polymerization process which allows the production of polymer particles with much reduced populations of undersized particles.

Microsuspension polymerization is a term referring to a specific kind of suspension polymerization process. "Suspension polymerization" refers to a process in which a polymerizable liquid is dispersed as droplets in a continuous aqueous medium and polymerized under continuous agitation. Normally, this process is carried out in the presence of a "granulating agent", such as a lyophilic polymer (starch, natural gums, polyvinyl alcohol or the like) or an insoluble fine powder such as calcium phosphate. These granulating agents help to obtain a dispersion of droplets of the polymerizable liquid but do not provide sufficient stabilization of the dispersion so that the dispersed droplets are stable in the absence of agitation. Therefore, in this method, it is necessary to carry out the polymerization under continuous high-energy mechanical agitation, since otherwise extensive coalescence of the droplets will occur, with separation of a bulk phase of the water immiscible, polymerizable material or the formation of large amounts of coagulum. Because this process depends on the details of the shear field in the reactor, and on the changing viscosity of the polymerizing dispersed phase, it is difficult to control reproducibly, is not readily scalable, and gives broad particle size distributions (PSDs).

Microsuspension polymerization also refers to a process in which the water-immiscible polymerizable liquid is dispersed in an aqueous medium. In this process, as in suspension polymerization, the water insoluble monomer is dispersed in the presence of a dispersion stabilizer or granulating agent to the desired size by using a mechanical shearing device such as on agitator, a high pressure homogenizer, colloid mill, ultrasonic horn or the like. In contrast to simple suspension polymerization, however, in microsuspension polymerization, the polymerization can then be carried out with no or minimal stirring (only enough to prevent creaming and provide good thermal transfer). Various dispersion stabilizers or granulating agents are well-known in the art (for example, surfactants such as sodium dodecyl sulfate or sodium dioctylsulfosuccinate, and hydrophilic polymers, for example polyvinyl alcohol, gelatin, methyl cellulose, methylhydroxypropyl cellulose, ethyl cellulose, sodium salt of carboxymethyl cellulose, polyacrylic acid and salts thereof, starch, gum, alginic acid salts, zein, casein, etc.). In some cases, granulating agents useful for suspension polymerization are also useful for microsuspension polymerization. Which process occurs is a function of the nature of the oil phase; that is, whether the dispersion is stable in the absence of mechanical agitation or whether it will coalesce before or during the polymerization process. Suspension polymerization is used to provide easily filterable polymer products, but these products are generally of ill-defined particle size and size distribution, usually of between 50–1000 micrometers. Microsuspension polymerization can be used to provide products with mean particle sizes less than 20 micrometers. However, a disadvantage of the microsuspension method is that it is difficult or impossible to avoid the formation of a significant amount of polymer in the form of latex particles (of size less than 1 micrometer) at the same time. In an ideal microsuspension polymerization, the particle size distribution of the product polymer would match that of the original monomer dispersion; that is, the distribution of the particles formed during the dispersion step. The latex is presumed to be formed by diffusion of monomer from the large droplets to micellar structures in the aqueous phase. This process is well-known as conventional emulsion polymerization (latex polymerization) but is an unwelcome side reaction in microsuspension polymerization.

SUMMARY OF THE INVENTION

The invention provides a method of making polymeric particles of at least 1.0 micrometers by forming at atmospheric pressure droplets of an ethylenically unsaturated monomer which is liquid or solid at standard conditions of 0° C. and one atmosphere pressure, together with from about 0.01 to about 5 percent by weight, based on the weight of the monomer, of a nonreactive compound in an aqueous medium, the nonreactive compound having a solubility in water less than that of the ethylenically unsaturated monomer, the aqueous medium containing a surfactant or organic hydrophilic colloid, the monomer droplets being formed by using only sufficient energy to achieve a size of 1.0 micrometer or larger, and polymerizing the ethylenically unsaturated monomer.

DESCRIPTION OF PREFERRED EMBODIMENTS

The population of small latex particles in the process of this invention can be substantially reduced by the addition of a small amount of a nonreactive compound, this compound being more hydrophobic than that of the ethylenically unsaturated monomers. Thus, when the polymer from which particles are made is a homopolymer, the nonreactive compound is more hydrophobic than the monomer and when the polymer from which the particles are made is a copolymer of two or more ethylenically unsaturated monomers, the nonreactive compound is more hydrophobic than the most hydrophobic monomer employed.

While it is not the intent to be bound by any particular theory or mechanism concerning the method of this invention, it is believed that the latex particles are formed by diffusion of monomers prior to or during polymerization and that the nonreactive compound prevents or reduces the rate of diffusion, and thereby reduces the formation of the latex. Thus, an effective nonreactive compound is one which reduces the rate of diffusion sufficiently to minimize emulsion polymerization. Such additives should be inert under the polymerization conditions, so that they do not affect either the polymerization process or the properties of the polymer formed. In particular, they should not be chain transfer agents, chain terminating agents, polymerization inhibitors, or radical sequestrates.

It is to be understood that mechanisms other than diffusion may in fact be responsible for the formation of latex particles and the effectiveness of the incorporation of hydrophobic additives may be due to an as yet undiscovered mechanism.

Any suitable ethylenically unsaturated monomers that are liquid or solid at one atmosphere pressure and 0° C. may be used in making particles by means of the technique described in this invention, including vinyl substituted aromatic molecules, such as styrene, vinyl benzylchloride, vinyl toluene, p-chlorostyrene, divinyl benzene, or vinyl naphthalene; vinyl acetate, vinyl propionate, vinyl benzoate, or vinyl butyrate; esters of α-methylene monocarboxylic acids, such as methyl acrylate, ethyl acrylate, n-butyl acrylate, n-octyl acrylate, 2-chloroethyl acrylate, phenyl acrylate, methyl-α-chloroacrylate, methyl methacrylate, ethyl methacrylate, butyl methacrylate, or ethylene glycol bis(methacrylate); acrylonitrile, methacrylonitrile, acrylamide, isopropylacrylamide, t-butylacrylamide dimethylacrylamide; vinyl ethers, such as vinyl methyl ether, vinyl isobutyl ether, and vinyl ethyl ether; vinyl ketones, such as vinyl methyl ketone, vinyl hexyl ketone, and methyl isopropenyl ketone; acrolein; vinylidene halides, such as vinylidene chloride; and N-vinyl compounds, such as N-vinylpyrrolidone, N-vinyl pyrrole, N-vinyl carbazole, and N-vinyl indole; mixtures thereof, and the like.

If desired, a suitable crosslinking monomer may be used in forming polymer droplets by polymerizing a monomer or monomers within droplets in accordance with this invention to thereby modify the polymeric particle and produce particularly desired properties. Typical crosslinking monomers are aromatic divinyl compounds such as divinylbenzene, divinylnaphthalene or derivatives thereof; diethylene carboxylate esters and amides such as diethylene glycol bis(methacrylate), diethylene glycol diacrylate, and other divinyl compounds such as divinyl sulfide or divinyl sulfone compounds.

Any of the nonreactive compounds having hydrophobic properties defined in terms of $LogP_{(calc)}$ as set forth in commonly owned U.S. patent application No. 08/221,544, filed Mar. 31, 1994, which is a Continuation-in-Part of U.S. patent application No. 08/152,753 filed Nov. 15, 1993, now abandoned, may be used. $LogP_{(calc)}$ is the logarithm of the octanol-water partition coefficient calculated using Med-Chem, version 3.54, a software package available from the Medicinal Chemistry Project, Pomona College, Claremont, Calif. This software package is well known and accepted in the chemical and pharmaceutical industries. $LogP_{(calc)}$ is a parameter which is highly correlated with measured water solubility for compounds spanning a wide range of hydrophobicity. The nonreactive hydrophobic compounds used in this invention are either liquid or oil soluble solids. As indicated above, the nonreactive compound is more hydrophobic than that of the monomer or monomers and has a higher $LogP_{(calc)}$ than the monomer by at least 1.0 unit and more preferably by 3.0 units. Suitable nonreactive, hydrophobic compounds are those selected from the following classes of compounds, among others:

I. Saturated and unsaturated hydrocarbons and halogenated hydrocarbons, including alkanes, alkenes, alkyl and alkenyl halides, alkyl and alkenyl aromatic compounds, and halogenated alkyl and alkenyl aromatic compounds, especially those having a $LogP_{(calc)}$ greater than about 3.

II. Esters of saturated, unsaturated, or aromatic carboxylic acids containing a total of about 10 or more carbon atoms, especially those having a $LogP_{(calc)}$ greater than about 3.

III. Amides of carboxylic acids having a total of 10 or more carbon atoms, especially those having a $LogP_{(calc)}$ greater than about 3.

IV. Esters and amides of phosphorus- and sulfur-containing acids having a $LogP_{(calc)}$ greater than about 3, and other compounds of similar hydrophobicity.

Compounds of Class I include: straight or branched chain alkanes such as, for example, hexane, octane, decane, dodecane, tetradecane, hexadecane, octadecane, 2,2,6,6,9,9-hexamethyldodecane, eicosane, or triacontane; alkenes such as, for example, heptene, octene, or octadecene; substituted aromatic compounds such as, for example, octylbenzene, nonylbenzene, dodecylbenzene, or 1,1,3,3-tetramethylbutylbenzene; haloalkanes such as, for example, heptyl chloride, octyl chloride, 1,1,1-trichlorohexane, hexyl bromide, 1,11-dibromoundecane, and halogenated alkyl aromatic compounds such as, for example, p-chlorohexylbenzene and the like.

Compounds of Class II include: methyl laurate, butyl laurate, methyl oleate, butyl oleate, methyl stearate, isopropyl palmirate, isopropyl stearate, tributyl citrate, acetyl tributyl citrate, phenethyl benzoate, dibutyl phthalate, dioctyl phthalate, dioctyl terephthalate, bis(2-ethylhexyl) phthalate, butyl benzyl phthalate, diphenyl phthalate, dibutyl sebacate, didecyl succinate, and bis(2-ethylhexyl) azelate and the like.

Compounds of Class III include: lauramide, N-methyllauramide, N,N-dimethyllauramide, N,N-dibutyllauramide, N-decyl-N-methylacetamide, and N-oleylphthalimide and the like.

Compounds of Class IV include, for example, sulfates, sulfonates, sulfonamides, sulfoxides, phosphates, phosphonates, phosphinates, phosphites, or phosphine oxides. Particular examples include diesters of sulfuric acid, such as, for example, dihexylsulfate, didecylsulfate, and didodecylsulfate; esters of various alkyl sulfonic acids including, for example, methyl decanesulfonate, octyl dodecanesulfonate, and octyl p-toluenesulfonate; sulfoxides, including, for example, bis(2-ethylhexyl)sulfoxide; and sulfonamides, including, for example, N-(2-ethylhexyl)-p-toluenesulfonamide, N-hexadecyl-p-toluenesulfonamide, and N-methyl-N-dodecyl-p-toluenesulfonamide. Phosphorus-containing compounds include, for example, triesters of phosphoric acid such as, for example, triphenyl phosphate, tritolylphosphate, trihexylphosphate, and tris(2-ethylhexyl)phosphate; various phosphonic acid esters, such as, for example, dihexyl hexylphosphonate, and dihexyl phenylphosphonate; phosphite esters such as tritolylphosphite, and phosphine oxides such as trioctylphosphine oxide.

Representative compounds are given below, along with their $LogP_{(calc)}$ value, calculated using the above-mentioned MedChem software package (version 3.54).

|  | $LogP_{calc}$ |
|---|---|
| Nonreactive Compound |  |
| hexane | 3.87 |
| octane | 4.93 |
| decane | 5.98 |
| dodecane | 7.04 |
| hexadecane | 9.16 |
| dimethylphthalate | 1.36 |
| dibutlphthalate | 4.69 |
| bis(2-ethylhexyl)phthalate | 8.66 |
| dioctylphthalate | 8.92 |
| tritolylphosphate | 6.58 |
| tris(2-ethylhexyl)phosphate | 9.49 |
| dodecylbenzene | 8.61 |
| bis(2-ethylhexyl)azelate | 9.20 |
| trioctylphosphine oxide | 9.74 |
| dinonyl phthalate | 9.98 |
| didecyl phthalate | 11.04 |
| didodecyl phthalate | 13.15 |
| 3-(4-hydroxy-3,5-di-t-butylphenyl)-propionic acid, octadecyl ester | 14.07 |
| trioctyl amine | 10.76 |
| Monomer |  |
| acrylic acid | 0.16 |
| isopropyl acrylamide | 0.20 |
| β-(hydroxyethyl)methacrylate | 0.25 |
| vinyl acetate | 0.59 |
| methyl acrylate | 0.75 |
| methyl methacrylate | 1.06 |
| ethyl acrylate | 1.28 |
| ethyl methacrylate | 1.59 |
| butyl acrylate | 2.33 |
| butyl methacrylate | 2.64 |
| styrene | 2.89 |
| divinyl benzene | 3.59 |
| mixture of vinyl toluenes | 3.37 |
| 2-ethylhexyl acrylate | 4.32 |
| 2-ethythexyl methacrylate | 4.62 |
| t-butylstyrene | 4.70 |

The hydrophobic compound is employed in an amount of at least about 0.01, preferably at least about 0.05 and most preferably at least about 0.5 percent by weight based on the weight of the monomer with the upper limit being 5 percent. Hexadecane is the preferred nonreactive compound.

Any catalyst or initiator which is soluble in the particular monomer or monomers polymerized within the droplets may be utilized in the process of the invention. Typical initiators for polymerization are the peroxide and azo initiators. Among those found suitable for use in the process of the invention are 2,2'-azobis(isobutyronitrile), 2,2'-azobis(methylbutyronitrile), 2,2' azobis (2,4-dimethyl valeronitrile), lauroyl peroxide, benzoyl peroxide and the like which result in complete polymerization without leaving detrimental residual materials. Chain transfer agents may also be added to the monomer to control the properties of the polymer particles formed.

EXAMPLES

Preparation 1 (Control)

To a mixture of 640 g vinyl toluene and 160 g divinyl benzene is added 5.0 g Aerosol OT-100 (sodium dioctyl sulfosuccinate, sold by American Cyanamide) and 4.0 g 2,2'-azobis(isobutyronitrile) sold by DuPont under the trade designation of Vazo 64. This mixture is then added to 2,548 g distilled water and stirred for 5 minutes followed by passing through a Gaulin colloid mill running at 3,500 rpm, 0.006" gap and 1 gal/min feed rate. This milled emulsion is put into a 5 liter round bottom flask and reacted for 16 hours at 70° C. and 100 rpm stirring. The flask is then heated to 80° C. for 2 hours and cooled.

Preparation 2 (Invention)

The procedure of preparation 1 is repeated except 8.0 g hexadecane is added to the monomers before they are mixed with water.

Preparation 3 (Control)

To a mixture of 800 g vinyl toluene and 200 g divinyl benzene is added 20 g Aerosol OT-100 (sodium dioctyl sulfosuccinate, sold by American Cyanamide) and 15 g of 2,2'-azobis(methylbutyronitrile) sold by Akzo Chemical under the trade designation Perkadox AMBN. This mixture is then added to 3,190 g distilled water and stirred for 5 minutes followed by passing through a Gaulin colloid mill running at 3,000 rpm, 0.01" gap and 1 gal/min feed rate. This milled emulsion is put into a 5 liter round bottom flask and reacted for 16 hours at 67° C. and 100 rpm stirring. The flask is then heated to 80° C. for 2 hours and cooled.

Preparation 4 (Invention)

The procedure of preparation 14 is repeated except 5.0 g hexadecane is added to the monomers before they are mixed with water.

The particle size is measured by a Microtrac Ultrafine Particle Analyzer as shown in the TABLE. The size distribution curves are distinctly bimodal with some of the particles as sub-micrometeric latex and some as desired larger particles.

TABLE

| PREPARATION | HEXACANE (wt % vs. Monomers) | MODE 1 | | MODE 2 | |
|---|---|---|---|---|---|
|  |  | Mean Size | wt % | Mean Size | wt % |
| 1 (control) | 0% | 0.32 μm | 11.1% | 4.2 μm | 88.9% |
| 2 (invention) | 1% | 0.32 μm | 3.9% | 2.1 μm | 96.1% |
| 3 (control) | 0% | 0.12 μm | 100% | — | — |
| 4 (invention) | 0.5% | 0.13 μm | 61.8% | 1.3 μm | 38.2% |

The data in the Table shows that hexadecane, a nonreactive compound, reduces the amount of undesirable sub-micrometeric latex particles and more of the desired particles over 1 μm are formed.

What is claimed is:

1. A method of making polymeric particles of from 1.0 to less than 20 micrometer which comprises forming at atmospheric pressure droplets of an ethylenically unsaturated monomer, the monomer being liquid or solid at standard conditions of 0° C. and one atmosphere pressure, together with from about 0.01 to about 5 percent by weight, based on the weight of the monomer, of a nonreactive compound in an aqueous medium, the nonreactive compound having a solubility in water less than that of the ethylenically unsaturated monomer, the aqueous medium containing a surfactant or organic hydrophilic colloid, the monomer droplets being formed by using only sufficient energy to achieve a size of 1.0 to less than 20 micrometer, and polymerizing the ethylenically unsaturated monomer.

2. The method of claim 1 wherein polymeric polymer is a copolymer of at least two ethylenically unsaturated monomers and the nonreactive compound has a solubility in water less than that of the most water soluble ethylenically unsaturated monomer.

3. The method of claim 1 wherein the nonreactive compound has a $LogP_{(calc)}$ greater than the $LogP_{(calc)}$ of the ethylenically unsaturated monomer.

4. The method of claim 3 wherein the difference of $LogP_{(calc)}$ of the nonreactive compound and the monomer is at least 1.

5. The method of claim 3 wherein the difference of $LogP_{(calc)}$ of the nonreactive compound and the monomer is at least 3.

6. The method of claim 1 wherein the monomer contains a free radical initiator.

7. The method of claim 1 wherein the nonreactive compound is hexadecane.

8. The method of claim 1 wherein the amount of the nonreactive compound is from 0.05 to 5 percent by weight.

9. The method of claim 1 wherein the amount of the nonreactive compound is from 0.5 to 5 percent by weight.

* * * * *